United States Patent Office 2,939,510
Patented June 7, 1960

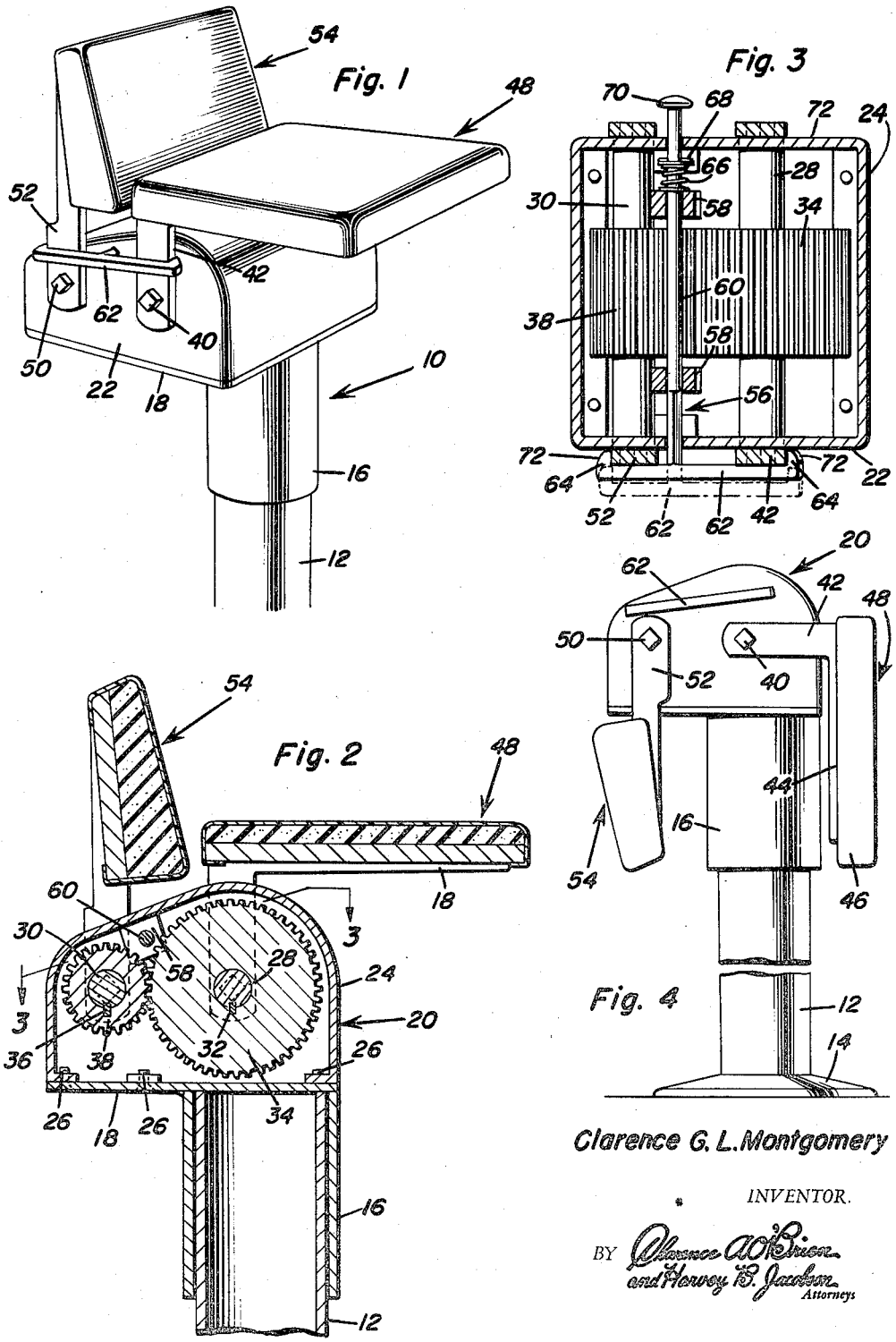

2,939,510
FOLDING SEAT

Clarence G. L. Montgomery, 627 E. Cache La Poudre, Colorado Springs, Colo.

Filed Jan. 2, 1959, Ser. No. 784,534

4 Claims. (Cl. 155—2)

This invention relates in general to new and useful improvements in seat construction, and more specifically to a folding seat primarily intended for use in stadiums.

One of the primary objections to stadium seats is the fact that even when the seat portion thereof is folded, the backrest of the seat prevents ready access to seats of the next row of seats. It is therefore the primary object of this invention to provide an improved folding seat which is of such a nature whereby the seat portion and the backrest may both be folded into depending relation so as to occupy a minimum of width when the seat is not in use.

Another object of this invention is to provide an improved folding seat wherein the seat and the backrest are so interconnected whereby when the seat is swung from its depending position to its horizontal occupant seating position, the backrest is automatically swung upwardly to its back supporting position.

Another object of this invention is to provide an improved folding seat for a stadium and the like, the folding seat including a base which carries a pair of shafts, the shafts in turn supporting the seat and the backrest, and the shafts being meshed together by means of gears carried thereby so that the seat and the backrest move in unison between stored position and operative position.

A further object of this invention is to provide an improved folding seat which includes a pair of shafts which carry support arms for a seat and a backrest, the seat and backrest being swingable to stored positions and being slightly disposed in an occupant receiving position, there being provided a simple latch which is engaged with the support arms of the seat and backrest so as to retain the seat and backrest in an occupant receiving position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the folding seat which is the subject of this invention and shows the folding seat in its occupant receiving position;

Figure 2 is an enlarged vertical sectional view taken substantially upon a plane through the center of the seat and shows the specific details of the components thereof;

Figure 3 is an enlarged sectional view taken substantially upon the plane indicated by the section line 3—3 of Figure 2 and shows the specific details of the latch of the seat; and Figure 4 is an elevational view of the seat showing the components thereof in their stored position.

Referring now to the drawings in detail, it will be seen that there is illustrated a seat which is the subject of this invention, the seat being of the folding type and being referred to in general by the reference numeral 10. The seat 10 includes a standard 12 which extends upwardly from the base 14 which may be secured in any desired manner to a part of the stadium of which the folding seat is a part.

Telescoped over the upper end of the standard 12 is a sleeve 16 which is secured to a base plate 18 of a base which is referred to in general by the reference numeral 20. The base 20 is in the form of a housing which includes a body portion 24 which functions as a front wall, a top wall and a rear wall, and a pair of side panels 22, the side panels 22 being formed integrally with the body portion 24. The body portion 24 is removably secured to the base 18 by means of fasteners 26, as is best illustrated in Figure 2.

Extending through the forward portions of the end plates 22 and rotatably journalled therein is a first shaft 28. Extending through and rotatably journalled in rear portions of the end plates 22 is a second shaft 30. The shafts 28 and 30 are disposed in spaced parallel relation. The shaft 28 has mounted thereon and keyed thereto by means of a key 32 a gear 34. The shaft 30 has mounted thereon and keyed thereto by means of a key 36 a gear 38. The gears 34 and 38 are disposed in meshing engagement with each other.

The shaft 28 has square end portions 40 on which there are mounted support arms 42. The support arms 42 are connected together by means of a transverse plate 44 which underlies a cushion member 46 of a seat portion 48.

The shaft 30 also has square ends, the square ends of the shaft 30 being referred to by the reference numeral 50. Mounted on the ends 50 of the shaft 30 are support arms 52 which are connected together by a backrest 54.

It is to be noted, as is best illustrated in Figure 4, that when in their stored position, the seat portion 48 is vertically disposed in front of the base 20 and the backrest 54 is vertically disposed in depending relation rearwardly of the base 20. On the other hand, when in their occupant receiving positions, the seat portion 48 is horizontally disposed and the backrest 54 is vertically disposed. Inasmuch as the backrest 54 is swung through approximately 180° angle while the seat portion 48 is rotated only through approximately 90° angle, the gear 34 is approximately twice as large as the gear 38. Thus it is merely necessary to swing the seat portion 48 from its depending position of Figure 4 to its horizontal position of Figure 1 and the backrest 54 will swing from its depending position of Figure 4 to its upstanding position of Figure 1.

In order that the backrest 54 and the seat portion 48 may be retained in their occupant receiving position from Figure 1, there is provided a latch which is referred to in general by the reference numeral 56. The latch 56 includes a pair of depending ears 58 connected to the top part of the bottom portion 54. Slidably journalled in the ears 58 is a latch rod 60. The latch rod 60 is provided at the left end thereof, as viewed from the front, with a cross portion 62 which is disposed generally parallel to one of the end plates 22. Cross portions 62 terminate in offset ends 64. When the seat portion 48 and the backrest 54 are in their occupant receiving position of Figure 1, pivoting of the seat portion 48 and backrest 54 is prevented by engagement of the support arms 42 and 52 by the projecting portion 64, as is best shown in Figures 1 and 3.

The latch 56 is retained in engagement with the support arms 42 and 52 by means of a spring 66 carried by the rod 60 and bearing against one of the ears 58. The opposite end of the spring 66 engages the transverse pin 68 carried by the rod 60. The end of the rod 60 remote from the cross member 62 is provided with a push knob 70.

When it is desired to disengage the latch 56, it is merely necessary to push inwardly on the push knob 70 so as to move the cross member 62 to its dotted line position in Figure 3. Then the seat portion 48 is free to be swung downwardly to its stored position of Figure 4. On the other hand, when it is desired to move the seat portion 48 and the backrest 54 to their operative positions of Figure 1, it is merely necessary to swing the seat portion 48 up to the position illustrated in Figure 1 at which time the backrest 54 will assume the position of Figure 1. As the support arms 42 and 52 swing to the position illustrated in Figure 1, edges thereof will engage cam surfaces 72 of the projections 64 so as to urge the cross member to the position illustrated in Figure 2. This permits the support arms 42 and 52 to move to the position illustrated in Figure 3 and which time the coil spring 56 will return the cross member 62 to its solid line position of Figure 3 and automatically latch the seat portion 48 and the backrest 54 in their operative positions.

From the foregoing, it will be readily apparent that there has been devised an extremely simple folding seat which may be used in stadiums and the like so as to occupy a minimum of space and at the same time which may be readily swung or folded from its folded and stored position to an operative position and automatically retained in that position against accidental disengagement.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A folding seat comprising a housing, a seat including a substantially flat portion, a backrest including a substantially flat portion, said housing having a pair of opposed end plates, a pair of shafts extending through said housing and rotatably journaled in said end plates, said seat secured to a first of said shafts with said seat flat portion spaced from said shaft, said backrest secured to a second of said shafts with said backrest flat portion spaced from said shaft, means interconnecting said shafts for rotation in opposite directions.

2. A folding seat comprising a housing, a seat including a substantially flat portion, a backrest including a substantially flat portion, said housing having a pair of opposed end plates, a pair of shafts extending through said housing and rotatably journaled in said end plates, said seat secured to a first of said shafts with said seat flat portion spaced from said shaft, said backrest secured to a second of said shafts with said backrest flat portion spaced from said shaft, means interconnecting said shafts for rotation in opposite directions, said last named means including meshed gears secured to said shafts within said housing.

3. A folding seat comprising a housing, a seat including a substantially flat portion, a backrest including a substantially flat portion, said housing having a pair of opposed end plates, a pair of shafts extending through said housing and rotatably journaled in said end plates, said seat secured to a first of said shafts with said seat flat portion spaced from said shaft, said backrest secured to a second of said shafts with said backrest flat portion spaced from said shaft, means interconnecting said shafts for rotation in opposite directions, said last named means including meshed gears secured to said shafts within said housing, said meshed gears being of unequal size.

4. A folding seat comprising a housing, a seat including a substantially flat portion, a backrest including a substantially flat portion, said housing having a pair of opposed end plates, a pair of shafts extending through said housing and rotatably journaled in said end plates, said seat secured to a first of said shafts with said seat flat portion spaced from said shaft, said backrest secured to a second of said shafts with said backrest flat portion spaced from said shaft, means interconnecting said shafts for rotation in opposite directions between an operative and a stored position, and latch means engaging said backrest and said seat for retaining said backrest and said seat in said operative positions.

References Cited in the file of this patent

UNITED STATES PATENTS

| | | |
|---|---|---|
| 196,036 | Nolan | Oct. 9, 1877 |
| 436,723 | Oppenheim | Sept. 16, 1890 |
| 720,524 | Johnston | Feb. 10, 1903 |
| 1,158,612 | Wiesenfeld | Nov. 2, 1915 |
| 1,198,480 | Richardson | Sept. 19, 1916 |
| 1,350,041 | Squire | Aug. 17, 1920 |
| 2,043,287 | Dorton | June 9, 1936 |
| 2,760,559 | Austin | Aug. 28, 1956 |
| 2,771,124 | Borsani | Nov. 20, 1956 |

FOREIGN PATENTS

| | | |
|---|---|---|
| 1,138,670 | France | Jan. 28, 1957 |